May 31, 1949. N. A. CHRISTENSEN 2,471,933
SEALING DEVICE
Original Filed May 26, 1943
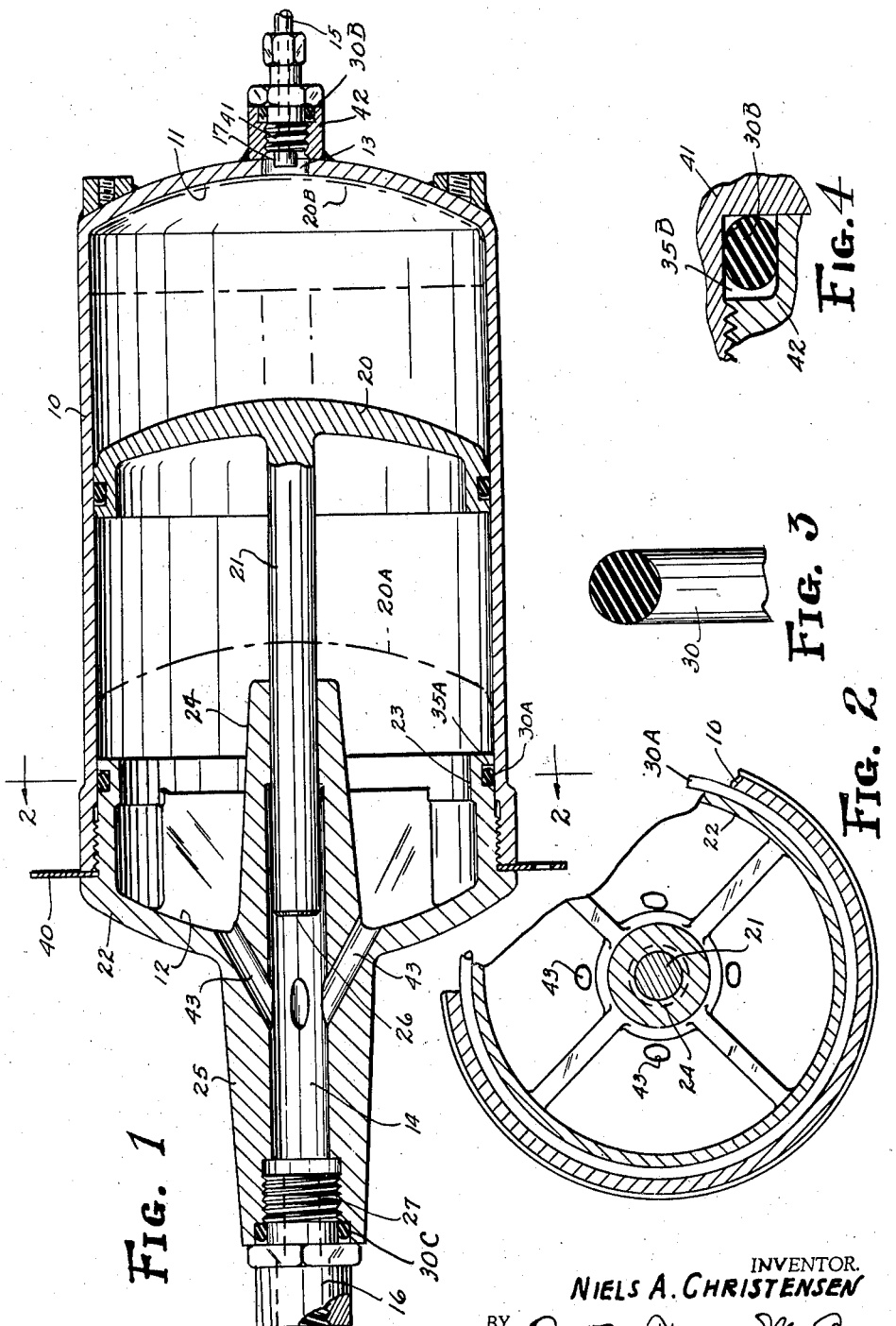
INVENTOR.
NIELS A. CHRISTENSEN
BY
ATTORNEYS Patented May 31, 1949

2,471,933

UNITED STATES PATENT OFFICE 2,471,933

SEALING DEVICE

Niels A. Christensen, South Euclid, Ohio

Original application May 26, 1943, Serial No. 488,530. Divided and this application April 12, 1945, Serial No. 587,981

1 Claim. (Cl. 285—154)

This application is a division of my application Serial No. 488,530, filed May 26, 1943, for an Accumulator, now Patent 2,406,197.

The general object of this invention is to provide an effective seal between a pair of coacting disconnectable members which are relatively stationary in use and where the joint between the members is subjected to fluid pressure. It is an object of the invention to provide such a seal in a very simple form which shall be effective in service and durable in use.

A further object of the invention is to provide an efficient seal between two members screw-threaded together, which seal shall not be liable to be abraded or injured by the relative rotation of the members in tightening the joint or by subsequent separation and rejoining of the parts.

My invention is well adapted, for instance, for sealing the connection between a cylinder head and a cylinder, or between a removable conduit and a chamber to which it is connected, or between various members, one of which is screwed into the other. The invention is hereinafter more fully described in connection with the illustrative embodiment shown in the drawings and the essential novel features are summarized in the claim.

In the drawings, Fig. 1 is a longitudinal section through an accumulator equipped with several of my seals at various locations; Fig. 2 is a cross section of such accumulator in a radial plane indicated by the line 2—2 on Fig. 1; Fig. 3 is a fragmentary section taken radially through the sealing ring of this invention; Fig. 4 is an enlarged cross section of the seal shown at the admission end of the accumulator.

I will first describe briefly, the accumulator shown by way of example in Figs. 1 and 2. Such accumulator comprises a cylinder 10 which has end walls 11 and 12, each of which has a passageway designated 13 and 14, respectively, through which fluid may be admitted to the cylinder. A conduit 15 is attached to one end of the cylinder for communication with the passageway 13, while another conduit 16 is attached to the other end for communication with the passageway 14. In practice, air under pressure is forced into the cylinder through the conduit 15 and is held therein by means of a check valve, such as that used in an automobile tire and indicated at 17, while the conduit 16 is connected to the hydraulic system with which the accumulator is intended to be used.

A movable partition in the form of a piston 20 is shown within the cylinder, the same being guided by a stem 21 which projects into the member 22 which forms the end wall 12. Preferably, such member is a cup-like structure having a substantially cylindrical wall portion 23 which is adapted to extend into the cylinder and to be in threaded engagement therewith. The member may also have an extension 24 which projects into the cylinder and which functions to guide the piston rod as aforesaid. An outer extension 25 is arranged for receiving the conduit 16 and has sufficient length that when the piston reaches the end of its available movement toward the conduit 16, as indicated by the broken lines 20—A, the end 26 of the piston rod will clear the end of the nipple 27 which is utilized for connecting the conduit 16 to the extension 25. Similarly, the inner extension 24 is sufficiently long that when the piston is at the limit of its travel toward the conduit 15, as indicated by the broken line 20—B, the end of the piston rod is still disposed within the extension 24.

The cylinder described may be supported in any convenient manner, but for purpose of illustration I have shown a supporting plate 40 clamped between the cylinder head 22 and the end of the cylinder wall 10. The cylinder head 22 and the nipples 27 and 41, are each mounted in the respective carrying portion of the device by being screw-threaded therein as shown in Fig. 1. Such screw thread is not fluid tight but my seal, about to be described, renders the joint between the respective members perfectly tight.

To seal the gas and liquid chambers where the cylinder head joins the body of the cylinder, as well as the conduits shown as connected to the cylinder heads, I utilize the sealing element of this invention. This element comprises an annular packing ring which may be made of solid rubber or a synthetic composition which is very dense and which yet possesses considerable liveliness and elasticity. Such ring is circular in the plane of the ring and prior to the assemblage has a circular cross section, as indicated at 30 in Fig. 3.

The outer periphery of the sealing ring is normally slightly larger than the bore of the annular wall against which such outer periphery seats. The depth of the groove occupied by the ring is less than the cross-sectional diameter of the unapplied ring, but has a width greater than the major axis of the applied ring, as shown in Fig. 4.

Accordingly, when the ring is put in place it is compressed into a substantially ellipsoidal cross section, as indicated at 30—A, 30—B and 30—C in Fig. 1, and shown in larger scale in Fig. 4. This detail shows the particular ring 30—B but the rings 30—A and 30—C are of the same cross-sectional shape, and I utilize the same principle for sealing the cylinder head to the cylinder, nipple 27 to the cylinder head, and the nipple 41 to the extension 42 on the other end of the cylinder.

It results from the described relationship of the ring to the groove that fluid under pressure within the cylinder passing along the thin annular space between the inserted member and the surrounding wall will encounter the ring and force it against the far wall of the groove. On the other hand, upon a reduction in pressure in the cylinder the ring by its own elasticity works back toward its position against the opposite wall of the groove. This movement of the yielding ring keeps it alive and pliable so that it is effective for a very long period of time.

In the particular embodiment shown in Fig. 1, air under pressure is forced into the cylinder through the conduit 15, while oil under pressure is forced into the cylinder through the conduit 16, passageway 14, and oblique passageway 43, until the pressures reach the desired operating degree. The amount of air injected is such that when the system is normally ready for operation the piston 20 is positioned approximately at the mid-portion of the cylinder. The source of air may then be disconnected, while that pumped into the cylinder is retained therein by the check valve 17. The air thus provides a source of potential energy for forcing oil within the cylinder into the system whenever demand for it occurs during use. Thus the actual pressures on opposite sides of the piston continually vary in use, which produces the desired kneading effect on the packing rings.

It should be particularly noted that in each instance of my sealing ring shown at 30—A, 30—B and 30—C, the ring is entirely independent of the two metal surfaces which are caused to abut each other when the screw threaded member (22, 41, 27) is turned into final position. Hence the ring is entirely free from the abrading action of such surfaces which heretofore has frequently injured a gasket interposed between them. This relief from clamping strain on the packing material itself increases the life of the packing and at the same time the packing is free for kneading movement to maintain it active, and thus further prolong its life.

I claim:

The combination of a hollow member adapted to contain fluid under pressure, a member attached thereto and stationary therewith, said member having a recess opening outwardly therefrom, a packing element in the recess and comprising a resilient ring normally substantially circular in cross-section, and acting alone in the recess, the depth of the recess being smaller than the normal cross-sectional diameter of the ring, whereby the ring is deformed into an ellipsoidal cross-section, the recess having a width greater than the longest cross-sectional dimension of the deformed ring, whereby the ring may be shifted the recess by fluid pressure in the hollow member, and a coupling member extending through said ring and having a threaded connection with said first-mentioned member.

NIELS A. CHRISTENSEN.

REFERENCES CITED

The following references are of record in the file of this patent:

UNITED STATES PATENTS

| Number | Name | Date |
|---|---|---|
| 2,187,217 | Winslow | Jan. 16, 1940 |
| 2,349,170 | Jackman | May 16, 1944 |
| 2,394,364 | Christensen | Feb. 5, 1946 |
| 2,420,104 | Smith | May 6, 1947 |